US008842996B2

(12) United States Patent
Yokoi

(10) Patent No.: US 8,842,996 B2
(45) Date of Patent: Sep. 23, 2014

(54) APPARATUS AND METHOD FOR TRANSMITTING DATA BY USING VISIBLE LIGHT

(75) Inventor: Atsuya Yokoi, Yokohama (JP)

(73) Assignee: Samsung Electronics Co., Ltd (KR)

( * ) Notice: Subject to any disclaimer, the term of this patent is extended or adjusted under 35 U.S.C. 154(b) by 103 days.

(21) Appl. No.: 13/510,808

(22) PCT Filed: Feb. 17, 2011

(86) PCT No.: PCT/KR2011/001073
§ 371 (c)(1),
(2), (4) Date: May 18, 2012

(87) PCT Pub. No.: WO2011/102662
PCT Pub. Date: Aug. 25, 2011

(65) Prior Publication Data
US 2012/0257898 A1 Oct. 11, 2012

(30) Foreign Application Priority Data

Feb. 17, 2010 (JP) .................................. 2010-032930
Jan. 26, 2011 (KR) ........................ 10-2011-0008003

(51) Int. Cl.
H04B 10/00 (2013.01)
H04B 10/12 (2006.01)
H04B 10/116 (2013.01)
H04L 27/26 (2006.01)

(52) U.S. Cl.
CPC .......... *H04B 10/116* (2013.01); *H04L 27/2697* (2013.01)
USPC ............................ 398/183; 398/172; 398/187

(58) Field of Classification Search
USPC ..................... 398/79, 172, 183, 187
See application file for complete search history.

(56) References Cited

U.S. PATENT DOCUMENTS 7,215,635 B2 *  5/2007  Song et al. .................... 370/208
8,112,011 B2    2/2012  Nobe et al.
2005/0249298 A1 * 11/2005  Kim et al. ..................... 375/260

(Continued)

FOREIGN PATENT DOCUMENTS

JP    2003-051788    2/2003
JP    2005-354553    12/2005

(Continued)

OTHER PUBLICATIONS

PCT/ISA/237 Written Opinion issued on PCT/KR2011/001073 (pp. 4), 2011.

(Continued)

*Primary Examiner* — Dalzid Singh
(74) *Attorney, Agent, or Firm* — The Farrell Law Firm, P.C.

(57) ABSTRACT

Disclosed is an apparatus and a method for transmitting data by using visible light. The transmission apparatus includes: a Serial-to-Parallel (S/P) converter for performing a Serial-to-Parallel conversion on transmission data, and generating multiple parallel data; a modulation means for modulating the multiple parallel data generated by the S/P converter, and generating multiple modulation signals; an Inverse Fast Fourier Transform (IFFT) means for performing an IFFT on the multiple modulation signals so that the multiple modulation signals are orthogonal to one another, and generating an IFFT signal; and a light-emitting means for causing a light source to emit light based on the IFFT signal generated by the IFFT means.

19 Claims, 9 Drawing Sheets

(56) References Cited

U.S. PATENT DOCUMENTS

2009/0257344 A1* 10/2009 Huang et al. .................. 370/210
2010/0027994 A1*  2/2010 Xu et al. ........................ 398/43
2010/0329683 A1* 12/2010 Liu ................................ 398/81

FOREIGN PATENT DOCUMENTS

| JP | 2008252444 | 10/2008 |
| JP | 2010-514278 | 4/2010 |
| JP | 2011-124798 | 6/2011 |
| KR | 1020080066893 | 7/2008 |
| KR | 1020100065034 | 6/2010 |
| WO | WO 2007043789 | 4/2007 |
| WO | WO 2010062094 | 6/2010 |

OTHER PUBLICATIONS

PCT/ISA/210 Search Report issued on PCT/KR2011/001073 (pp. 3), 2011.

* cited by examiner

APPARATUS AND METHOD FOR TRANSMITTING DATA BY USING VISIBLE LIGHT

TECHNICAL FIELD

The present invention relates to an apparatus and a method for transmitting data, and more particularly to an apparatus and a method for transmitting data by using visible light.

BACKGROUND ART

Light communication technology using light in a visible light range has recently attracted a lot of attention. Particularly, following rapid progress in the propagation of lighting devices using light-emitting elements including a light-emitting Diode (LED), etc., research and development have been conducted on implementing a very convenient data communication environment (i.e. a visible light communication system) by utilizing a lighting device installed inside or outside of a house. When considering influence on human bodies, medical devices, etc., an LED becomes the strongest candidate among light-emitting elements used in light communication.

However, a data transmission speed in light communication depends on a response speed of a light-emitting element or a driving circuit for the light-emitting element. Therefore, for the purpose of requiring a high data transmission speed, a Laser Diode (LD) or a Super Luminescent Diode (SLD), which has a faster response speed than the LED, is also considered as a strong candidate.

In order to make a data transmission speed more improved, technology for stably transmitting large amounts of data during the emission of a single signal by a light-emitting element is also required. As an example of the light communication technology as described above, the following patent document 1 discloses a technology for eliminating space interference by allocating the time axis of an OFDM (Orthogonal Frequency Division Multiplexing) signal in a space direction.

DISCLOSURE OF INVENTION

Technical Problem

The use of an OFDM scheme improves frequency use efficiency and multipath tolerance. Accordingly, the OFDM scheme is widely used in a wireless communication system (e.g. a wireless Local Area Network (LAN)) or a wired communication system (e.g. an Asymmetrical Digital Subscriber Line (ADSL)). As in the wireless or wired communication system, the application of the OFDM scheme to the light communication is expected to improve communication quality of the light communication. An OFDM signal includes multiple carrier signals (i.e. multiple modulated sine waves). Accordingly, in order to transmit an OFDM signal without distortion, there is a requirement for a transmission circuit having a large dynamic range and a high linearity.

It is usual that LEDs and an LED driving circuit are designed for the purpose of light emission of a predetermined light amount. Accordingly, the LEDs and the LED driving circuit as described above do not have a large dynamic range or a high linearity. Therefore, in order to apply the OFDM scheme to the light communication, there is a need for special LEDs and a special LED driving circuit having a large dynamic range or a high linearity. However, it is difficult to implement the special LEDs and the special LED driving circuit. Even though it is possible to implement the special LEDs and the special LED driving circuit, production cost thereof becomes even more expensive than that of usual LEDs and a usual LED driving circuit. Therefore, it is not possible to use the existing lighting infrastructure. Hence, it is not practical to apply the OFDM scheme to the light communication.

Therefore, the present invention has been made in view of the above-mentioned problems, and the present invention provides an apparatus and a method for transmitting data, which do not require a light-emitting means to have a large dynamic range and a high linearity, can improve communication quality by employing an OFDM scheme, and meet novelty and are improved as well.

Solution to Problem

In accordance with an aspect of the present invention, there is provided a transmission apparatus including: a Serial-to-Parallel (S/P) converter for performing a Serial-to-Parallel conversion on transmission data, and generating multiple parallel data; a modulation means for modulating the multiple parallel data generated by the S/P converter, and generating multiple modulation signals; an Inverse Fast Fourier Transform (IFFT) means for performing an IFFT on the multiple modulation signals so that the multiple modulation signals are orthogonal to one another, and generating an IFFT signal; and a light-emitting means for causing a light source to emit light based on the IFFT signal generated by the IFFT means.

Preferably, the IFFT means includes: a transmission signal generator for generating the multiple transmission signals by causing square waves of predetermined frequencies to carry the multiple modulation signals generated by the modulation means so that the multiple transmission signals are orthogonal to one another; and an adder for generating an addition signal by adding the multiple transmission signals generated by the transmission signal generator.

The configuration as described above can reduce the requirements for a dynamic range and linearity in the light-emitting means.

Also, the predetermined frequencies are defined by $f_n = f_0 \times (n+k)$ and $N = 2 \times (k+1)$, where n represents a natural number ranging from 1 to N, $f_0$ represents a predetermined value, and $k \geq 1$. The configuration as described above makes it possible to avoid the degradation of transmission characteristics due to the interference of harmonic components included in a transmission signal.

Also, the transmission signal generator generates an $m^{th}$ transmission signal by causing a square wave of frequency $f_m$ to carry an $m^{th}$ modulation signal, where m represents a natural number ranging from 1 to L, L<N, $f_m$ is defined by $f_m = f_0 \times (m+k)$, $f_0$ represents a predetermined value, $k \geq 1$, and L is defined by $N = 2 \times (k+1)$; and wherein the transmission signal generator generates a $q^{th}$ transmission signal by causing a square wave of frequency $f_q$, which is different from frequency $f_m \times d$, to carry a $q^{th}$ modulation signal, where $q^{th}$ is a natural number ranging from (L+1) to N, m represents a natural number ranging from 1 to L, d represents an odd number equal to or more than 1, $f_q$ is defined by $f_q = f_0 \times q$, and q>(L+k). The configuration as described above makes it possible that an effective use of OFDM carriers improves a transmission speed.

In accordance with another aspect of the present invention, there is provided a transmission method comprising: performing a Serial-to-Parallel conversion on transmission data, and generating multiple parallel data; modulating the multiple parallel data generated in performing the serial-to-parallel conversion, and generating multiple modulation signals;

performing an IFFT on the multiple modulation signals, and generating an IFFT signal; and causing a light source to emit light based on the IFFT signal generated in performing the IFFT.

Preferably, performing the IFFT includes: generating the multiple transmission signals by causing square waves of predetermined frequencies to carry the multiple modulation signals generated in modulating the multiple parallel data so that the multiple transmission signals are orthogonal to one another; and generating an addition signal by adding the multiple transmission signals generated in generating the multiple transmission signals.

Advantageous Effects of Invention

The configuration as described above can reduce the requirements for a large dynamic range and a high linearity in a light-emitting means and light-emitting elements.

BRIEF DESCRIPTION OF DRAWINGS

The foregoing and other objects, features and advantages of the present invention will become more apparent from the following detailed description when taken in conjunction with the accompanying drawings in which.

MODE FOR THE INVENTION

Hereinafter, exemplary embodiments of the present invention will be described in detail with reference to the accompanying drawings.

The following description includes specific details such as elements, etc., and the specific details are only provided in order to help a more comprehensive understanding of the present invention. Therefore, it will be apparent to those skilled in the art that predetermined changes in form and details may be made in the specific details without departing from the scope of the present invention.

The order of describing exemplary embodiments of the present will be briefly described as follows. First, referring to FIG. 1, a description will be made of the configuration of a visible light communication apparatus (i.e. a transmitter) 10 proposed when an OFDM scheme is applied to light communication. Next, referring to FIGS. 2 to 4, a description will be made of a spectrum of an OFDM signal, and signal waveforms of each carrier signal and the OFDM signal, which are proposed when the OFDM scheme is applied to the light communication.

Figure 5:
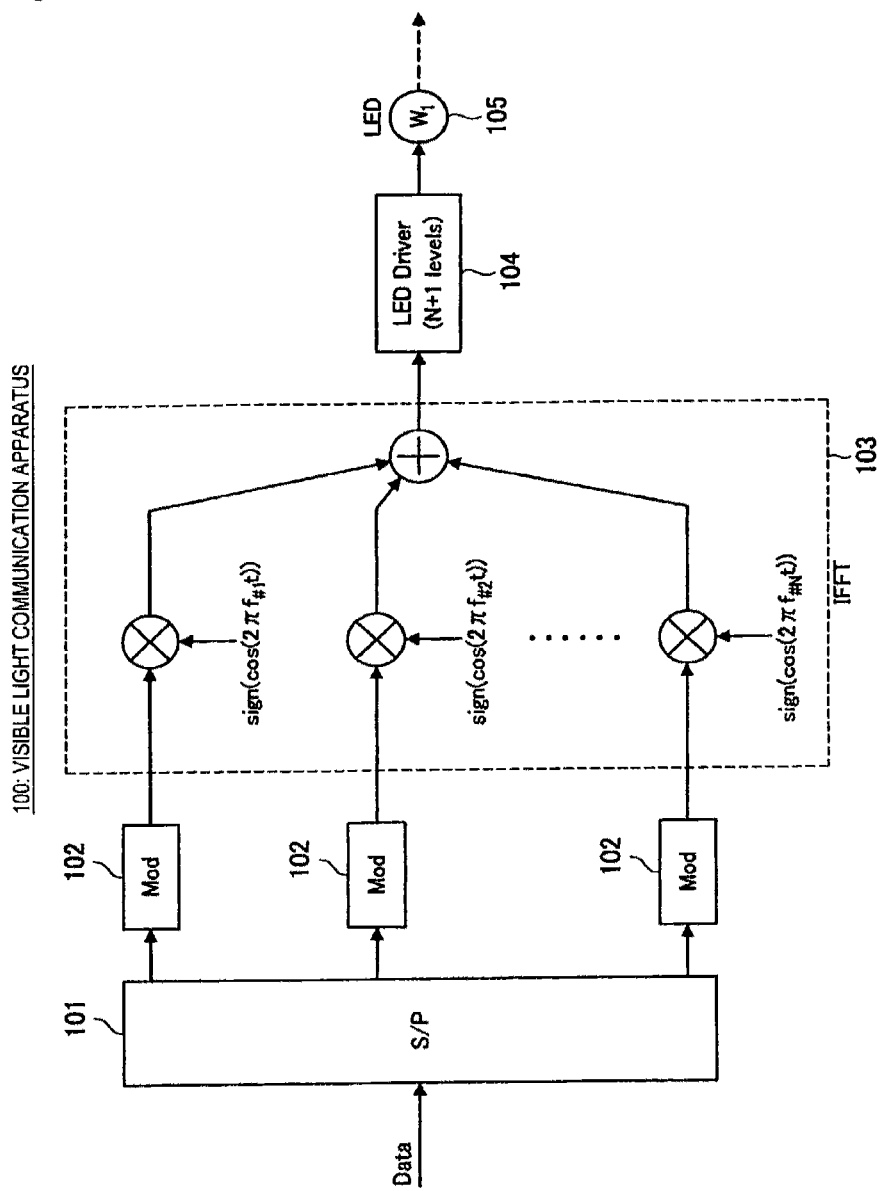
FIG. 5 is a block diagram illustrating the configuration of a visible light communication apparatus according to an embodiment of the present invention.
Figure 6:
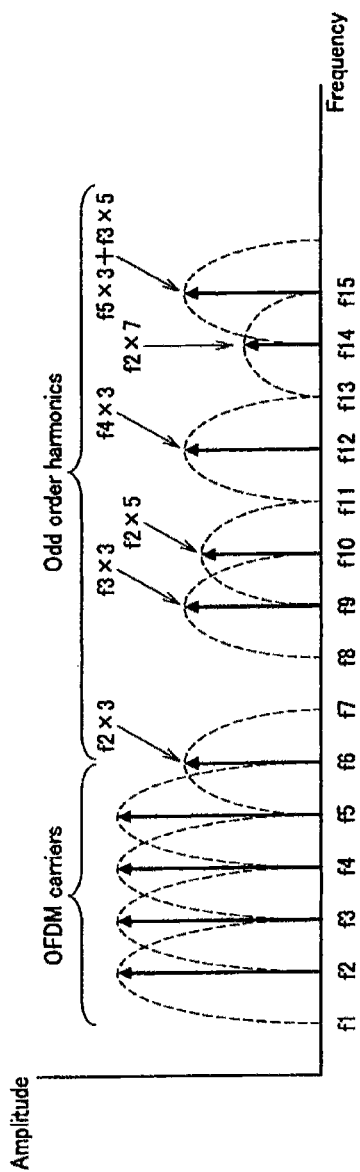
FIG. 6 is an explanatory view showing a spectrum of an OFDM signal according to an embodiment of the present invention.
Figure 7:
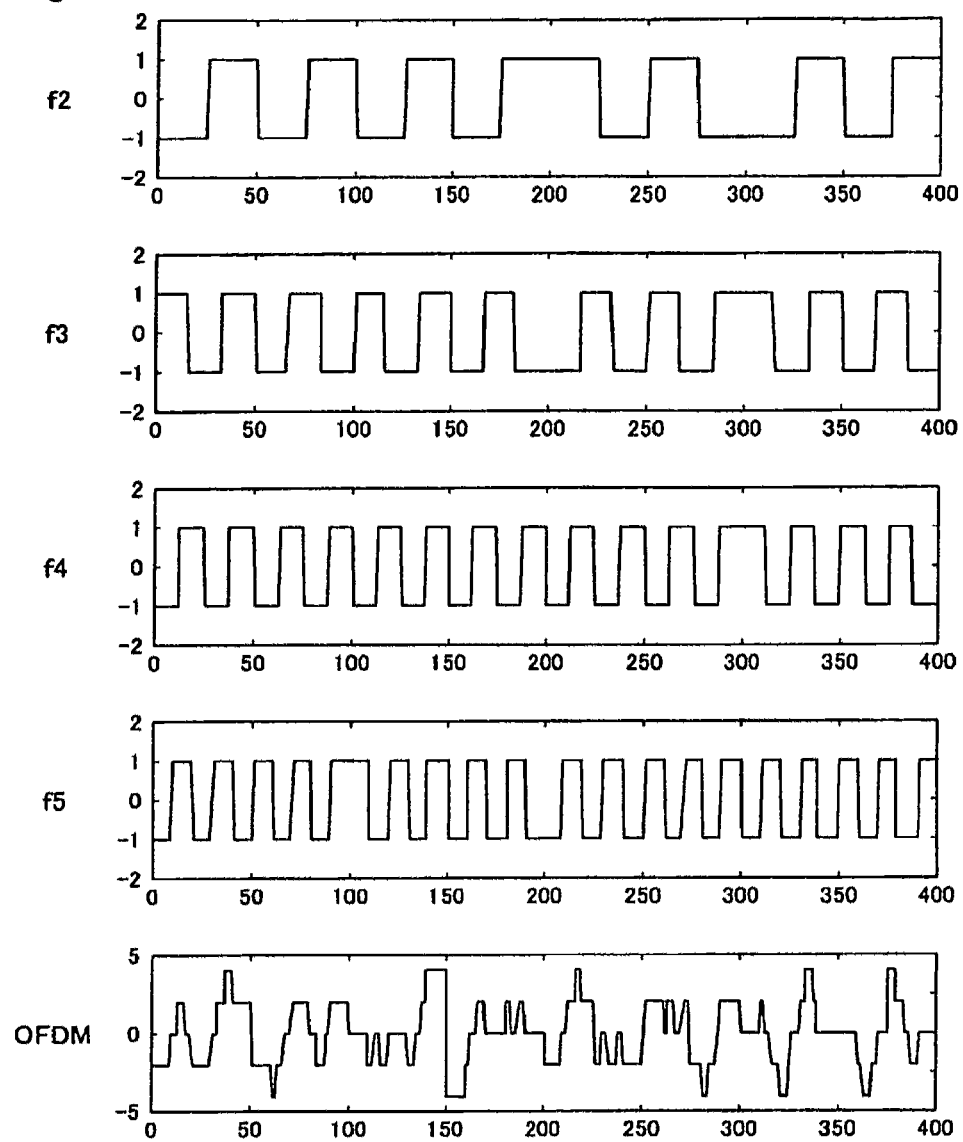
FIG. 7 is explanatory views showing signal waveforms of each carrier signal and an OFDM signal according to an embodiment of the present invention.
Figure 8:
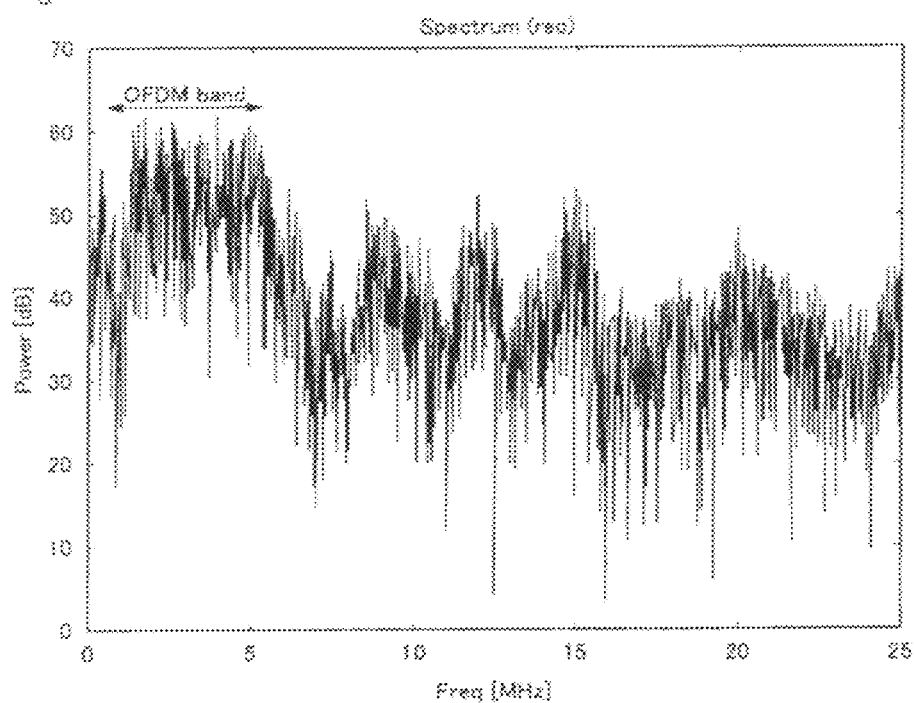
FIG. 8 is an explanatory view showing a spectrum of an OFDM signal according to an embodiment of the present invention.

Referring to FIG. 5, a description will be made of the configuration of a visible light communication apparatus (i.e. a transmitter) 100 according to this embodiment. Referring to FIGS. 6 to 8, a description will be made of a spectrum of an OFDM signal, and signal waveforms of each carrier signal and the OFDM signal according to this embodiment. Next, referring to FIG. 9, a description will be made of a specific circuit configuration of an LED driving circuit 104 according to this embodiment. Then, referring to FIGS. 10 and 11, a description will be made of first and second modified embodiments of this embodiment.

Embodiment

An embodiment of the present invention will be described as follows. This embodiment provides practical solutions to problems caused when an OFDM scheme is applied to light communication.

1. Configuration of a Visible Light Communication Apparatus 10

Figure 1:
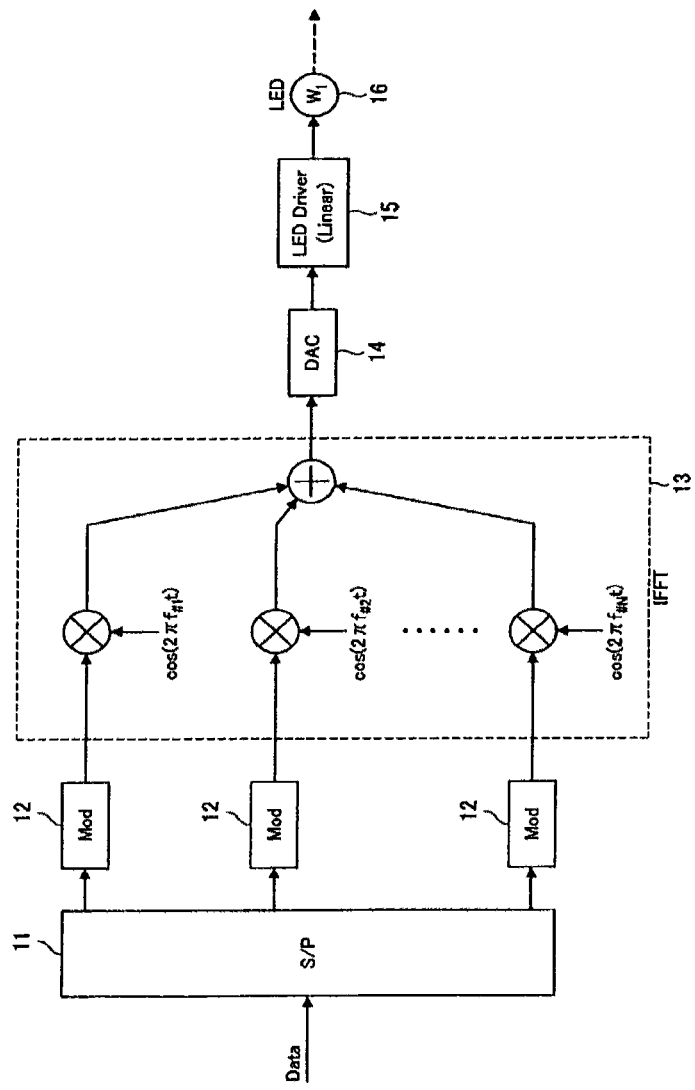
FIG. 1 is a block diagram illustrating the configuration of a visible light communication apparatus (i.e. a transmitter) proposed when light communication employs OFDM.
Figure 2:
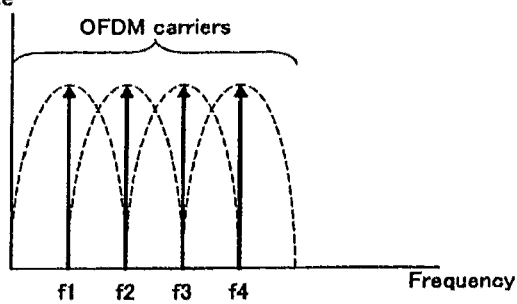
FIG. 2 is an explanatory view showing a spectrum of an OFDM signal proposed when light communication employs OFDM.
Figure 3:
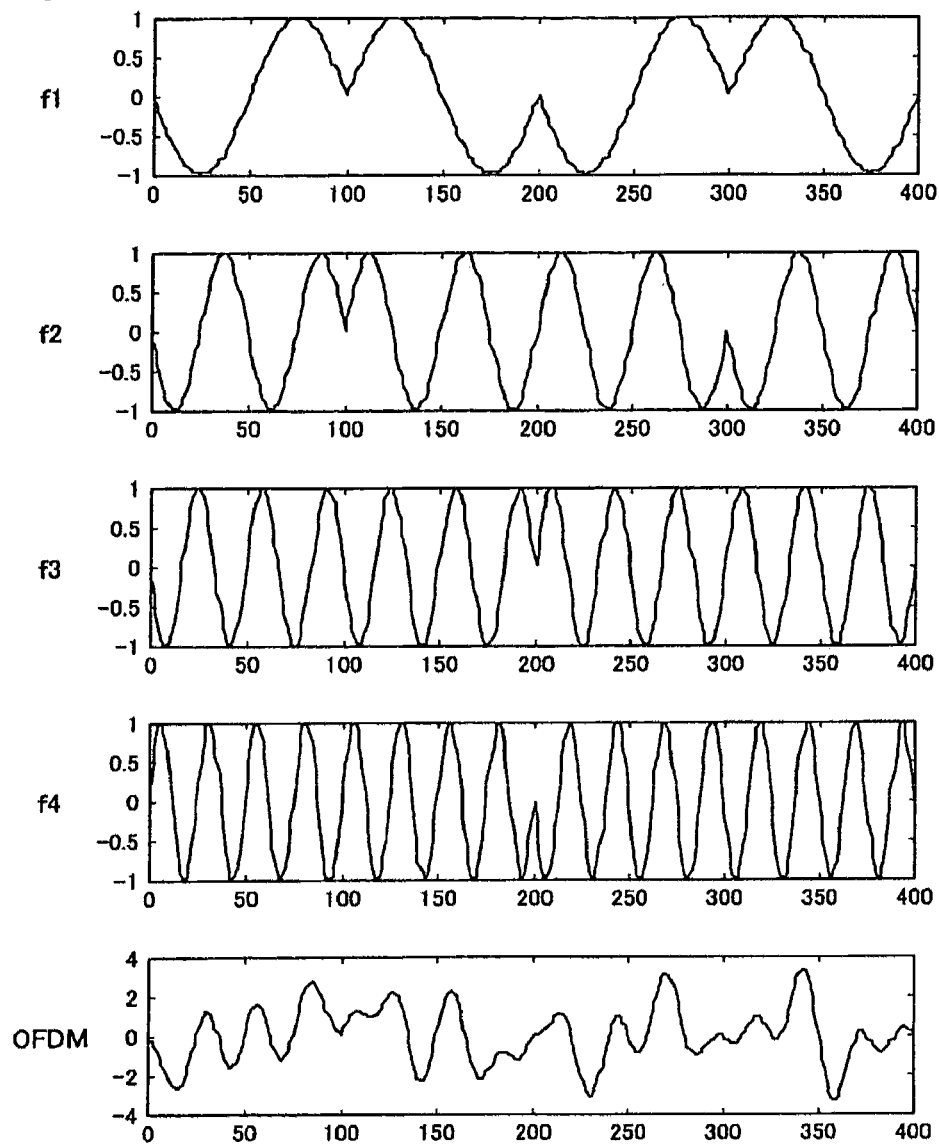
FIG. 3 is explanatory views showing signal waveforms of each carrier signal and an OFDM signal proposed when light communication employs OFDM.

First, referring to FIGS. 1 to 4, a description will be made of a configuration of a visible light communication apparatus 10 proposed when an OFDM scheme is applied to light communication. Then, problems caused by the above configuration will be described. FIG. 1 is a block diagram illustrating the configuration of a visible light communication apparatus (i.e. a transmitter) proposed when light communication employs OFDM. Each of FIG. 2 (a schematic diagram) and FIG. 4 (a calculation example) is an explanatory view showing a spectrum of an OFDM signal proposed when light communication employs OFDM. FIG. 3 is explanatory views showing signal waveforms of each carrier signal and an OFDM signal, which are proposed when light communication employs OFDM.

As illustrated in FIG. 1, a visible light communication apparatus 10 includes an S/P (Serial-to-Parallel) converter 11, multiple modulators 12, an IFFT (Inverse Fast Fourier Transform) unit 13, a D/A (Digital-to-Analog) converter 14, an LED driving circuit 15, and multiple LEDs 16.

First, transmission data is input to the S/P converter 11. Then, the transmission data, which has been input to the S/P converter 11, is parallelized to N parallel data by the S/P converter 11, where N represents the number of OFDM carriers and N≥2. Each of the N parallel data, which has been obtained through the conversion by the S/P converter 11, is input to the modulator 12. Each of the N parallel data, which has been input to the modulator 12, is modulated in a predetermined modulation scheme (e.g. Binary Phase-Shift Keying (BPSK) or multi-phase Phase-Sift Keying (PSK)) to a modulation signal. The modulation signal, which has been obtained through the modulation by each modulator 12, is input to the IFFT unit 13.

The IFFT unit 13 includes N multipliers and a single adder. The modulation signal, which has been output from each modulator 12, is input to the corresponding multiplier. Also, orthogonal carriers $\cos(2\pi f_{\#1}t)$ to $\cos(2\pi f_{\#N}t)$ of N types are input to the N corresponding multipliers.

The modulation signal and the carrier, which have been input to each multiplier, are multiplied by each multiplier. As a result, carrier signals, which correspond to N frequencies $f_{\#1}$ to $f_{\#N}$, are generated by the N multipliers, respectively. Then, the carrier signals of the frequencies $f_{\#1}$ to $f_{\#N}$ generated by the N multipliers are input to the adder. The carrier signals of the frequencies $f_{\#1}$ to $f_{\#N}$, which have been input to the adder, are added by the adder. As a result, an OFDM signal is generated by the adder.

Figure 4:
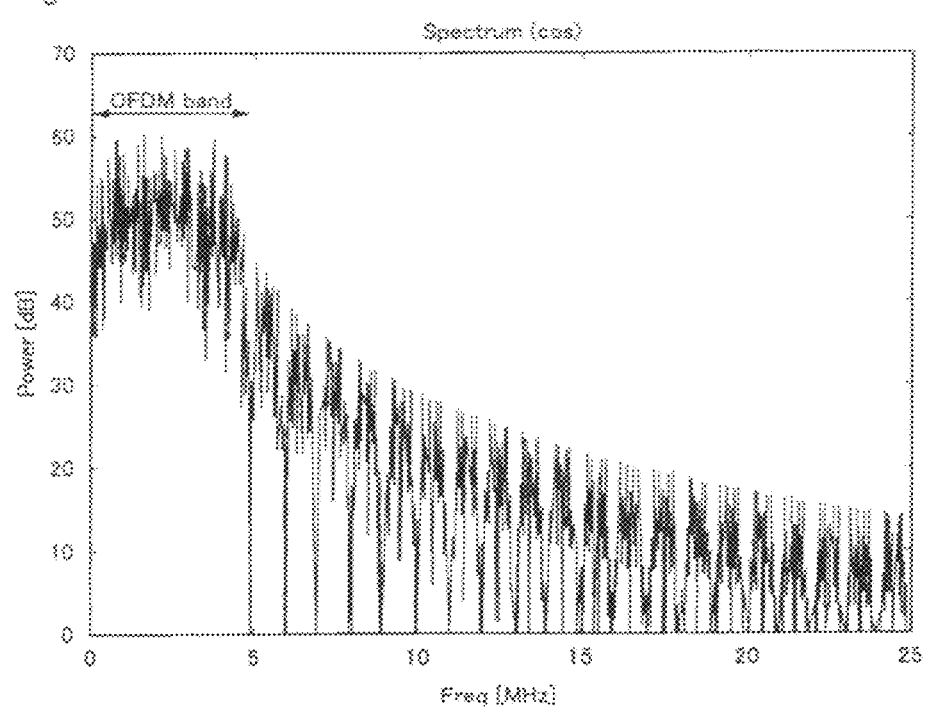
FIG. 4 is an explanatory view showing a spectrum (i.e. a calculation example) of an OFDM signal proposed when light communication employs OFDM.

The OFDM signal generated by the adder is output from the IFFT unit 13, and is input to the D/A converter 14. For example, a spectrum of the OFDM signal has a shape as shown in FIG. 2. FIG. 2 schematically shows an example of a spectrum shape of an OFDM signal for N=4 where $f_{\#k}=f_k$ (k ranges from 1 to 4 and $f_k=k \times f_1$). Also, carrier signals of frequencies $f_1$ to $f_4$ included in the OFDM signal have signal waveforms as shown in FIG. 3 where a horizontal axis is the time axis and a vertical axis represents signal intensity. FIG. 3 additionally shows a signal waveform of an OFDM signal obtained by adding the 4 carrier signals. Also, FIG. 4 shows a spectrum of an OFDM signal calculated on the conditions that $f_1$=1 MHz, $f_2$=2 MHz, $f_3$=3 MHz and $f_4$=4 MHz.

The OFDM signal having the spectrum and the signal waveform as described above is converted to an analog signal by the D/A converter 14. Then, the analog signal is input to the LED driving circuit 15. The LED driving circuit 15 drives the multiple LEDs 16 to emit visible light with a luminous intensity depending on a signal potential of the analog signal, and the multiple LEDs 16 emit visible light. As can be seen from the signal waveform of the OFDM signal illustrated in FIG. 3, in order to transmit the OFDM signal without distortion, the LED driving circuit 15 and the multiple LEDs 16 are required to have a large dynamic range and a high linearity. Also, when the OFDM signal has distortion, components of each carrier signal include harmonics, the harmonics interfere with components of another carrier signal, thereby degrading transmission characteristics. As described above, an OFDM signal is generated by superimposing multiple carrier signals having different frequencies. Accordingly, amplitudes of carrier signals are added at a part having matched phases, and an absolute value of the amplitude of the OFDM signal becomes up to about twice as much as the number of carrier signals. Also, the OFDM signal includes is generated by superimposing the multiple different carrier signals, and therefore the OFDM signal has a complex signal waveform of a detailed structure as illustrated in FIG. 3. When nonlinear distortion occurs in the LED driving circuit 15 and the multiple LEDs 16, the above detailed structure cannot be accurately reflected in a luminous intensity of the multiple LEDs 16. Accordingly, in order to prevent the OFDM signal from being distorted, the LED driving circuit 15 and the multiple LEDs 16 are required to have a high linearity.

Therefore, in order to implement the light communication employing the OFDM scheme by using the visible light communication apparatus 10 illustrated in FIG. 1, it is necessary to prepare the LED driving circuit 15 and the multiple LEDs 16 having a large dynamic range and a high linearity. However, even though it is possible to produce the special LED driving circuit 15 or the special LEDs 16 as described above, production cost thereof is very expensive. Also, it is not possible to implement the large dynamic range and the high linearity as described above in the existing LED driving circuit or the existing LEDs used for lighting, etc. Accordingly, it is not possible to implement the light communication employing the OFDM scheme by using the existing infrastructure. As a result, in order to implement the light communication employing the OFDM scheme, it is newly necessary to improve high-cost infrastructure. In this regard, it is impractical to implement the light communication employing the OFDM scheme. The following description will be made of providing solutions to the above problems.

2. Configuration of a Visible Light Communication Apparatus 100

Hitherto, the description has been made of the problems caused when the OFDM scheme is applied to the light communication. Hereinafter, referring to FIGS. 5 to 8, a description will be made of the configuration of a visible light communication apparatus 100 according to this embodiment which can solve the problems as described above. FIG. 5 is a block diagram illustrating the configuration of a visible light communication apparatus 100 according to this embodiment. FIG. 5 is a block diagram illustrating the configuration of a visible light communication apparatus 100 according to this embodiment. Each of FIG. 6 (a schematic diagram) and FIG. 8 (a calculation example) is an explanatory view showing a spectrum of an OFDM signal according to this embodiment. FIG. 7 is explanatory views showing signal waveforms of each carrier signal and an OFDM signal according to this embodiment.

As illustrated in FIG. 5, a visible light communication apparatus 100 includes an S/P (Serial-to-Parallel) converter 101, multiple modulators 102, an IFFT (Inverse Fast Fourier Transform) unit 103, an LED driving circuit 104, and multiple LEDs 105. In this regard, the main differences between the visible light communication apparatus 100 and the visible light communication apparatus 10 are whether the D/A converter 14 is included, how the IFFT unit 103 is configured, and how the LED driving circuit 104 is configured.

First, transmission data is input to the S/P converter 101. Then, the transmission data, which has been input to the S/P converter 101, is parallelized to N parallel data by the S/P converter 101, where N represents the number of OFDM carriers and N≥2. Each of the N parallel data, which has been obtained through the conversion by the S/P converter 101, is input to the modulator 102. Each of the N parallel data, which has been input to the modulator 102, is modulated in a predetermined modulation scheme (e.g. Binary Phase-Shift Keying (BPSK) or multi-phase Phase-Sift Keying (PSK)) to a modulation signal. The modulation signal, which has been obtained through the modulation by each modulator 102, is input to the IFFT unit 103. In addition, modulation schemes may be changed according to carriers.

The IFFT unit 103 includes N multipliers and a single adder. The modulation signal, which has been output from each modulator 102, is input to the corresponding multiplier. Also, orthogonal square waves $\text{sign}(\cos(2\pi f_{\#1}t))$ to $\text{sign}(\cos(2\pi f_{\#N}t))$ of N types are input to the N corresponding multipliers. Herein, sign(x) represents a function where sign(x) is equal to +1 for x>0, and sign(x) is equal to −1 for x<0. The modulation signal and the square wave, which have been input to each multiplier, are multiplied by each multiplier. As a result, carrier signals, which correspond to N frequencies $f_{\#1}$ to $f_{\#N}$, are generated by the N multipliers, respectively. Then, the carrier signals of the frequencies $f_{\#1}$ to $f_{\#N}$ generated by the N multipliers are input to the adder. The carrier signals of the frequencies $f_{\#1}$ to $f_{\#N}$, which have been input to the adder, are added by the adder. Then, an OFDM signal is generated by the adder.

At this time, the carrier signal generated by each multiplier includes odd-order harmonics. For example, a carrier signal obtained by multiplying the modulation signal by the square wave sign(cos($2\pi f_{\#1}t$)) includes odd-order harmonic components corresponding to frequencies $f_{\#1}\times 3$, $f_{\#1}\times 5$, $f_{\#1}\times 7$, etc. in addition to a main component corresponding to a carrier cos($2\pi f_{\#1}t$) of the frequency $f_{\#1}$. The above harmonic components interfere with another carrier signal, thereby degrading transmission characteristics. For example, when $f_{\#k}=f_k$ (where k ranges from 1 to 4 and $f_k=k\times f_1$, the harmonic component corresponding to the frequency $f_{\#1}\times 3$ interferes with a main component (i.e. a component corresponding to a carrier cos($2\pi f_{\#3}t$)) of the carrier signal corresponding to the frequency $f_{\#3}$.

The above interference can be avoided by using not the carrier signal corresponding to the frequency $f_{\#3}$ but only 2 carrier signals corresponding to the frequencies $f_{\#1}$ and $f_{\#3}$. However, it is natural that the improvement effect of a transmission speed, which is an advantage of the OFDM scheme, should be limited, so that the above configuration is not practical. Accordingly, the present invention proposes a method for using not a frequency $f_1$ but a frequency $f_2$ as illustrated in FIG. 6. When the above method is applied, a harmonic component of the frequency $f_{\#1}=f_2$ corresponds to $f_{\#1}\times 3=f_2\times 3=f_1\times 6$, and does not interfere with carrier signals corresponding to frequencies $f_3(f_{\#2})$, $f_4(f_{\#3})$ and $f_5(f_{\#4})$. As a result, when the 4 carrier signals corresponding to the frequencies $f_{\#1}$ to $f_{\#4}$ are used, transmission characteristics are not degraded by the interference.

Meanwhile, carrier signals of frequencies $f_2$ to $f_5$ have signal waveforms as illustrated in FIG. 7 where a horizontal axis is the time axis and a vertical axis represents signal intensity. FIG. 7 also shows a signal waveform of an OFDM signal obtained by adding the 4 carrier signals. Also, FIG. 8 shows a spectrum of an OFDM signal calculated on the conditions that $f_2=2$ MHz, $f_3=3$ MHz, $f_4=4$ MHz and $f_5=5$ MHz. As illustrated in FIG. 7, a main component of each carrier signal does not interfere with harmonic components of another carrier signal. Also, the harmonic components are generated in each carrier signal as illustrated in FIG. 8. Therefore, a relatively strong spectrum appears even in a frequency band higher than an OFDM band.

In this embodiment as described above, each carrier signal included in an OFDM signal is generated by using a square wave, and the application is made of a method in which carrier signals are arranged at frequencies in such a manner that harmonic components of each carrier signal may not interfere with another carrier signal. As illustrated in FIG. 7, the OFDM signal obtained by adding the N carrier signals has a step-shaped waveform having (N+1) amplitude levels, where N represents the number of carriers. When a scheme for multi-level modulation (e.g. 4-value Amplitude Shift Keying (ASK)) is used, the number of amplitude levels of an OFDM signal becomes more than (N+1). Accordingly, high transmission quality can be realized without the requirements for the large dynamic range or the high linearity in the LED driving circuit 104 or the multiple LEDs 105.

For example, when N=4 and a modulation scheme is BPSK, an OFDM signal, which is output from the IFFT unit 103, has a signal waveform having 5 values in amplitude levels as illustrated in FIG. 7. The OFDM signal is input to the LED driving circuit 104. Then, the LED driving circuit 104 drives the multiple LEDs 105 to emit visible light with signal intensity depending on the input OFDM signal.

When the OFDM signal has the 5 values in the amplitude levels, each of the multiple LEDs 105 has 5 steps in a luminous intensity. In this case, the LED driving circuit 104 drives the multiple LEDs 105 to emit visible light with luminous intensities of 5 steps. Also, a method for driving the multiple LEDs 105 will be described in the next paragraph where a specific circuit configuration of the LED driving circuit 104 will be illustratively described.

For the description, reference will be made to FIG. 8 showing a calculation example of a spectrum of an OFDM signal. In FIG. 8, the spectrum of the OFDM signal is calculated on the conditions that $f_2=2$ MHz, $f_3=3$ MHz, $f_4=4$ MHz and $f_5=5$ MHz. When the calculation example shown in FIG. 8 is compared with the calculation example shown in FIG. 4, shapes of the 2 spectrums are almost the same in an OFDM band ranging from 2 MHz to 5 MHz. Accordingly, an OFDM signal using square waves can be transmitted similarly to an OFDM signal using conventional carriers.

Also, out-of-band harmonic components (i.e. spurious emission) appearing in the spectrum of the OFDM signal shown in FIG. 8 are larger than those shown in FIG. 4. If the above spurious emission is generated from wireless transmission by a wireless LAN (Local Area Network) device or a mobile phone, it violates the radio regulation law. However, visible light communication is not regulated by the radio regulation law. Therefore, the spurious emission generation shown in FIG. 8 causes no problems.

Also, if the out-of-band spurious emissions cause power loss, it causes problems in the above wireless transmission. However, the visible light communication uses a light source as lighting, and therefore power loss due to the out-of-band spurious emissions hardly causes problems therein. Also, the frequency response characteristic of each LED 105 is gradually attenuated in many cases when the frequency becomes higher. Accordingly, even though the out-of-band spurious emission is generated, the power of the out-of-band spurious emission becomes less than a predetermined value. Also, the OFDM signal according to this embodiment can be demodulated by a receiver capable of receiving an OFDM signal transmitted by the visible light communication apparatus 10 illustrated in FIG. 1.

As described above, the use of the visible light communication apparatus 100 makes it possible to implement the light communication employing the OFDM scheme, which has good transmission characteristics, without using a light-emitting means having a large dynamic range and a high linearity. Also, because a special light-emitting means is not used, circuit design is relatively easy, and production cost can be reduced. Moreover, a special receiver needs not be used, and therefore a change in a system configuration can be reduced.

Specific Example of the LED Driving Circuit 104

Figure 9:
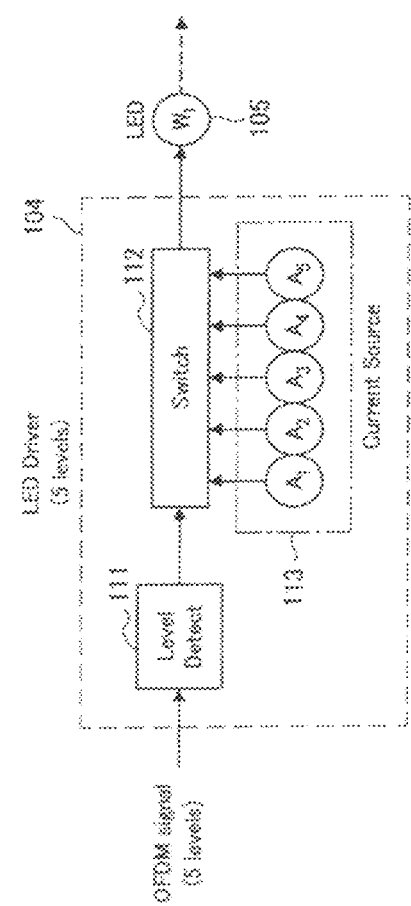
FIG. 9 is a block diagram illustrating a configuration example of an LED driving circuit according to an embodiment of the present invention.

A specific circuit configuration of the LED driving circuit 104 will be described with reference to FIG. 9. As described above, the LED driving circuit 104 according to this embodiment drives the multiple LEDs 105 to emit visible light with luminous intensities of (N+1) steps, where N represents the number of carriers. The above light-emitting control, for example, is implemented by using a circuit configuration illustrated in FIG. 9. FIG. 9 is a block diagram illustrating the specific circuit configuration of the LED driving circuit 104. FIG. 9 shows an example of the circuit configuration in the LED driving circuit 104 when the number of carriers is 4 (i.e. N=4).

In FIG. 9, the LED driving circuit 104 includes a level detector 111, a circuit switcher 112, and a current generation circuit 113. Also, the current generation circuit 113 includes 5 power sources corresponding to amplitude levels of 5 steps that an OFDM signal can have.

First, an OFDM signal, which is input to the LED driving circuit 104, is input to the level detector 111. The level detector 111 detects an amplitude level of the input OFDM signal. For example, the level detector 111 determines a threshold value based on a predetermined threshold value. Then, it detects which amplitude level a current amplitude level corresponds to among the 5 amplitude levels based on the determination result. The amplitude level of the OFDM signal, which has been detected by the level detector 111, is input to the circuit switcher 112.

When receiving the detected amplitude level of the OFDM signal as input, the circuit switcher 112 switches between power sources of the current generation circuit 113 so that the multiple LEDs 105 may emit visible light with a luminous intensity corresponding to the input amplitude level. A luminous intensity of each LED 105 is determined depending on a current value applied thereto. For this reason, the current generation circuit 113 includes the 5 power sources which output current values A1 to A5 corresponding to the amplitude levels that the OFDM signal can have. Accordingly, the circuit switcher 112 switches between current sources (i.e. power sources), any of which is output to the multiple LEDs 105, depending on the input amplitude level, and applies any of the current values A1 to A5 to the multiple LEDs 105.

The application of the circuit configuration as described above makes it possible to implement a practical LED driving circuit 104. For example, the level detector 111 may be implemented by a digital circuit. Also, the current generation circuit 113 may be implemented by using a constant voltage source and multiple resistors. Accordingly, the LED driving circuit 104 can be implemented on a relatively small circuit scale. It is also usual that LEDs for lighting are driven by a large current. Therefore, it is difficult to change a current value very rapidly and continuously. As can be seen from this reason, when the number of amplitude levels of the OFDM signal is relatively small, the circuit configuration illustrated in FIG. 9 can be considered to be very practical.

Also, the LED driving circuit 104 may be implemented by combining a D/A converter and a linear driving circuit. Even when the method according to this embodiment is applied to this case, a resolution (i.e. the number of bits) of the D/A converter can be significantly reduced. Moreover, it is possible to ease the requirements for the dynamic range and the linearity in the LED driving circuit 104. As a result, it is possible to reduce a circuit scale or production cost. It goes without saying that the requirements for a dynamic range and the linearity in the multiple LEDs 105 are reduced regardless of using any of the circuit configurations as described above.

3. Modified Embodiment 1

Hereinafter, a first modified embodiment of this embodiment will be described.

Figure 10:
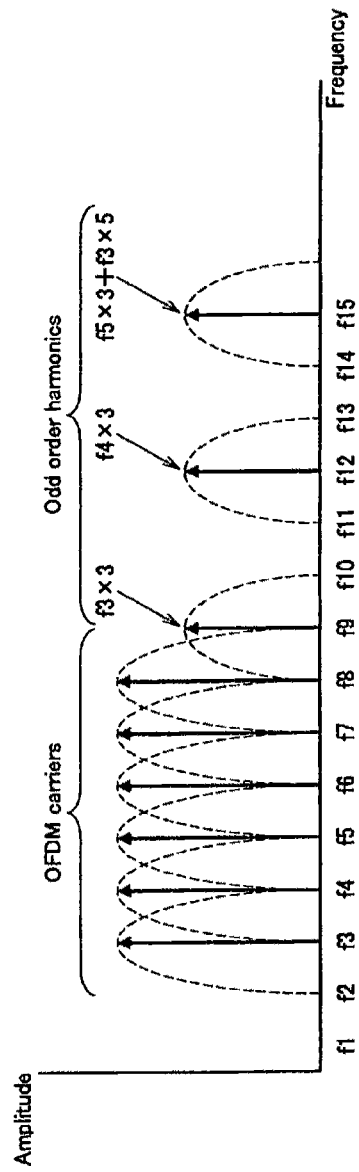
FIG. 10 is an explanatory view showing signal waveforms of each carrier signal and an OFDM signal according to a first modified embodiment of an embodiment of the present invention.

A method for arranging carrier signals according to the first modified embodiment of this embodiment will be described with reference to FIG. 10. FIG. 10 is an explanatory view showing the method for arranging carrier signals according to the first modified embodiment of this embodiment. As described above, each carrier signal generated by using a square wave includes odd-order harmonic components. Therefore, a method, in which a first (i.e. minimum) usable frequency $f_1$ is not used in an OFDM band, has been proposed as described above. Moreover, as described above, the application of the above method makes it possible to use carrier signals of frequencies $f_2$, $f_3$, $f_4$ and $f_5$ without being affected by the degradation of transmission characteristics due to interference.

In the first modified embodiment, the above method is extended, and a method, in which use is not made of up to a $k^{th}$ ($k \geq 2$) frequency $f_k$, is proposed. For example, when the frequencies $f_1$ and $f_2$ are not used, an OFDM signal includes carrier signals corresponding to frequencies equal to or more than $f_3$. Harmonic components of the frequency $f_3$ do not interfere with carrier signals corresponding to frequencies less than $f_3 \times 3 f_1 \times 9$. Accordingly, 6 carrier signals corresponding to frequencies $f_3$ to $f_8$ can be used. More generally, when carrier signals are not arranged up to the frequency $f_k$, harmonic components do not interfere with carrier signals corresponding to frequencies less than $f_{k+1} \times 3 = f_1 \times (k+1) \times 3$. Therefore, $2 \times (k+1)$ carrier signals corresponding to frequencies $f_{k+1}$ to $f_{3k+2}$ can be used.

As described above, the nonuse of carriers in a low band makes it possible to use a larger number of carriers, so that a transmission speed can be improved. This method is more effective when each LED 105 having a good frequency response characteristic is used.

4. Modified Embodiment 2

Hereinafter, a second modified embodiment of this embodiment will be described.

Figure 11:
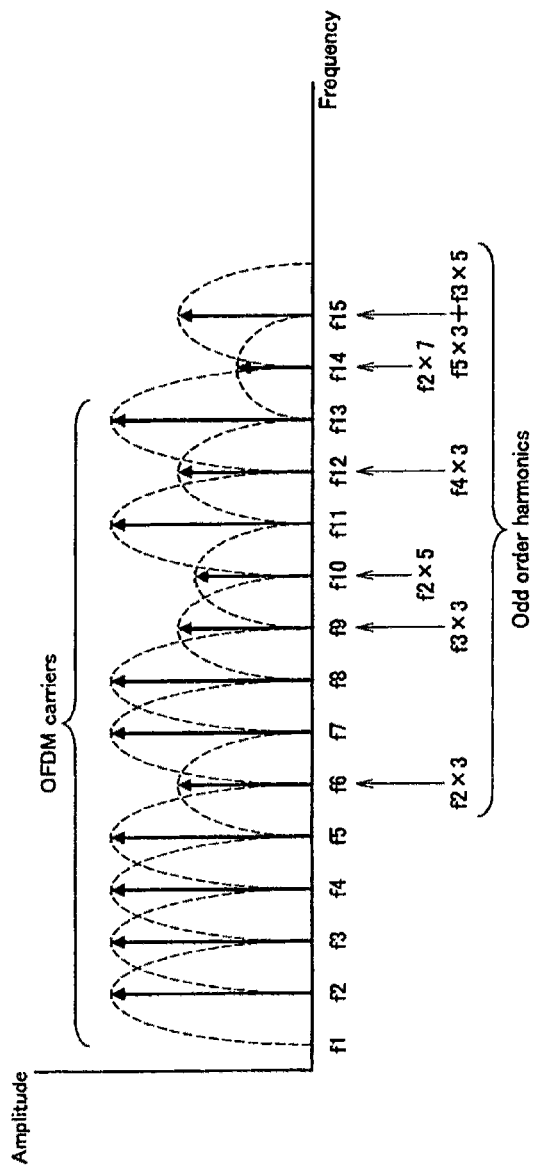
FIG. 11 is an explanatory view showing signal waveforms of each carrier signal and an OFDM signal according to a second modified embodiment of an embodiment of the present invention.

A method for arranging carrier signals according to the second modified embodiment of this embodiment will be described with reference to FIG. 11. FIG. 11 is an explanatory view showing the method for arranging carrier signals according to the second modified embodiment of this embodiment. As described above, each carrier signal generated by using a square wave includes odd-order harmonic components. Therefore, a method, in which a first (i.e. minimum) usable frequency $f_1$ is not used in an OFDM band, has been proposed as described above. Also, in the first modified embodiment, a method, in which use is not made of up to a carrier signal of a frequency $f_k$ ($k \geq 2$), has been proposed.

However, in the methods as described above, carrier signals are not arranged at some frequencies among frequencies at which harmonic components do not exist. Accordingly, the present invention proposes a method according to the second modified embodiment in which an effective use is made of carriers at the frequencies at which harmonic components do not exist and the carrier signals are not arranged in the method as described above.

For example, when a carrier of the frequency $f_1$ is not used, carrier signals are arranged at frequencies $f_2$ to $f_5$, respectively. Harmonic components of the carrier signals arranged at the frequencies $f_2$ to $f_5$ are generated at $f_6(=f_2 \times 3 = f_1 \times 6)$, $f_9(=f_3 \times 3 = f_1 \times 9)$, $f_{10}(=f_2 \times 5 = f_1 \times 10)$, $f_{12}(=f_4 \times 3 = f_1 \times 12)$, $f_{14}(=f_2 \times 7 = f_1 \times 14)$, and $f_{15}(=f_3 \times 3 = f_1 \times 15 = f_5 \times 3)$. In this case, harmonic components do not exist at frequencies $f_7$, $f_8$, $f_{11}$, $f_{13}$, $f_{14}$, etc. Therefore, in the second modified embodiment, carrier signals are arranged at the frequencies $f_7$, $f_8$, $f_{11}$, $f_{13}$, $f_{14}$, etc, respectively.

The use of carriers, which do not interfere with harmonic components as described above, makes it possible to use more carriers, so that a transmission speed can be further improved. This method is more effective when each LED 105 having a good frequency response characteristic is used.

Hitherto, the description has been made of the configuration of the visible light communication apparatus 100, the method for generating each carrier signal by using a square wave and the method for arranging carrier signals according to the embodiments as described above, and the first and second modified embodiments. The application of the above methods makes it possible to ease the requirements for the dynamic range and the linearity in the LED driving circuit 104 and the multiple LEDs 105. Moreover, the interference of harmonic components can be effectively avoided, and OFDM carrier signals can be effectively used even without degrading transmission characteristics. Even though the 3 types of methods for arranging carrier signals including the first and second modified embodiments have been described, various arrangements for carrier signals may be implemented by combining these methods.

Industrial Applicability

While the invention has been shown and described with reference to certain exemplary embodiments thereof, it will be understood by those skilled in the art that various embodiments or modified embodiments of the present invention may be made therein without departing from the spirit and scope of the invention. Therefore, the spirit and scope of the present invention must be defined not by the descried embodiments thereof but by the appended claims and equivalents of the appended claims.

The invention claimed is:

1. A transmission apparatus comprising:
a Serial-to-Parallel (S/P) converter for performing a serial-to-parallel conversion on transmission data, and generating multiple parallel data;
a modulation means for modulating the multiple parallel data generated by the S/P converter, and generating multiple modulation signals;
an Inverse Fast Fourier Transform (IFFT) means for performing an IFFT on the multiple modulation signals so that the multiple modulation signals are orthogonal to one another, and generating an IFFT signal; and
a light-emitting means for causing a light source to emit light based on the IFFT signal generated by the IFFT means,
wherein the multiple modulation signals are arranged to exclude at least one of a plurality of usable frequencies.

2. The transmission apparatus as claimed in claim 1, wherein the IFFT means comprises:
a transmission signal generator for generating the multiple transmission signals by causing square waves of predetermined frequencies to carry the multiple modulation signals generated by the modulation means so that the multiple transmission signals are orthogonal to one another; and
an adder for generating an addition signal by adding the multiple transmission signals generated by the transmission signal generator.

3. The transmission apparatus as claimed in claim 2, wherein the transmission signal generator comprises multiple multipliers for receiving as input the multiple transmission signals respectively, and the multiple multipliers receive as input orthogonal square waves of predetermined frequencies and multiply the multiple transmission signals by the orthogonal square waves of the predetermined frequencies, respectively.

4. The transmission apparatus as claimed in claim 2, wherein the predetermined frequencies are defined by $f_n = f_0 (n+k)$, where n represents a natural number ranging from 1 to $2(k+1)$, $f_0$ represents a predetermined value, and $k \geq 1$.

5. The transmission apparatus as claimed in claim 2, wherein the transmission signal generator generates an $m^{th}$ transmission signal by causing a square wave of frequency $f_m$ to carry an $m^{th}$ modulation signal, where m represents a natural number ranging from 1 to $2(k+1)$, $f_m$ is defined by $f_m = f_0 \times (m+k)$, $f_0$ represents a predetermined value, and $k \geq 1$; and
wherein the transmission signal generator generates a $q^{th}$ transmission signal by causing a square wave of frequency $f_q$, which is different from frequency $f_m \times d$, to carry a $q^{th}$ modulation signal, where $q^{th}$ is a natural number greater than $2k+3$, m represents a natural number ranging from 1 to $2(k+1)-1$, d represents an odd number greater than or equal to 1, and $f_q$ is defined by $f_q = f_0 \times q$.

6. The transmission apparatus as claimed in claim 1, wherein the modulation means comprises multiple modulators for receiving as input and modulating the multiple parallel data respectively.

7. The transmission apparatus as claimed in claim 1, wherein the IFFT means generates an OFDM signal related to the multiple modulation signals.

8. The transmission apparatus as claimed in claim 1, wherein the light-emitting means comprises a light-emitting element driving circuit for driving a light-emitting element to emit light with a luminous intensity depending on a signal output from the IFFT means.

9. The transmission apparatus as claimed in claim 8, wherein the light-emitting element driving circuit controls a luminous intensity of the light-emitting element in consideration of the number of carriers of the signal output from the IFFT means.

10. The transmission apparatus as claimed in claim 8, wherein the light-emitting element driving circuit comprises:
a level detector for detecting an amplitude level of the signal output from the IFFT means based on a predetermined threshold value;
a current generation circuit comprising multiple power sources, the number of which corresponds to the number of amplitude levels, for providing different currents respectively; and
a switcher for connecting at least one of the multiple power sources to the light-emitting element in response to the amplitude level detected by the level detector.

11. A transmission method comprising:
performing a serial-to-parallel conversion on transmission data, and generating multiple parallel data;
modulating the multiple parallel data generated in performing the serial-to-parallel conversion, and generating multiple modulation signals;
performing an IFFT on the multiple modulation signals, and generating an IFFT signal; and
causing a light source to emit light based on the IFFT signal generated in performing the IFFT,
wherein the multiple modulation signals are arranged to exclude at least one of a plurality of usable frequencies.

12. The transmission method as claimed in claim 11, wherein performing the IFFT comprises:
generating the multiple transmission signals by causing square waves of predetermined frequencies to carry the multiple modulation signals generated in modulating the multiple parallel data so that the multiple transmission signals are orthogonal to one another; and
generating an addition signal by adding the multiple transmission signals generated in generating the multiple transmission signals.

13. The transmission method as claimed in claim 12, wherein, in generating the multiple transmission signals, the multiple transmission signals are input, and orthogonal square waves of predetermined frequencies, and the multiple input transmission signals are multiplied by the orthogonal square waves of the predetermined frequencies, respectively.

14. The transmission method as claimed in claim 12, wherein the predetermined frequencies are defined by $f_n = f_0 (n+k)$, where n represents a natural number ranging from 1 to $2(k+1)$, $f_0$ represents a predetermined value, and $k \geq 1$.

15. The transmission method as claimed in claim 12, wherein, in generating the multiple transmission signals, an $m^{th}$ transmission signal is generated by causing a square wave of frequency $f_m$ to carry an $m^{th}$ modulation signal, where m represents a natural number ranging from 1 to 2(k+1), $f_m$ is defined by $f_m=f_0\times(m+k)$, $f_0$ represents a predetermined value, and k≥1; and wherein the transmission signal generator generates a $q^{th}$ transmission signal by causing a square wave of frequency $f_q$, which is different from frequency $f_m\times d$, to carry a $q^{th}$ modulation signal, where $q^{th}$ is a natural number greater than 2k+3, m represents a natural number ranging from 1 to 2(k+1)−1, d represents an odd number greater than or equal to 1, and $f_q$ is defined by $f_q=f_0\times q$.

16. The transmission method as claimed in claim 11, wherein, in performing the IFFT, an OFDM signal related to the multiple modulation signals is generated.

17. The transmission method as claimed in claim 11, wherein, in causing the light source to emit the light, a luminous intensity of the light-emitting element is controlled in consideration of the number of carriers of the IFFT signal.

18. The transmission method as claimed in claim 11, wherein causing the light source to emit the light comprises:

detecting an amplitude level of the IFFT signal based on a predetermined threshold value; and connecting at least one of multiple power sources, which provide different current values respectively, to a light-emitting element in response to the detected amplitude level.

19. A transmission apparatus comprising:

a Serial-to-Parallel (S/P) converter for performing a serial-to-parallel conversion on transmission data, and generating multiple parallel data; and a controller for modulating the multiple parallel data generated by the S/P converter, generating multiple modulation signals, performing an Inverse Fast Fourier Transform (IFFT) on the multiple modulation signals so that the multiple modulation signals are orthogonal to one another, and generating an IFFT signal, wherein the multiple modulation signals are arranged to exclude at least one of a plurality of usable frequencies.

* * * * *